(12) United States Patent
Kammeter et al.

(10) Patent No.: US 8,325,504 B2
(45) Date of Patent: Dec. 4, 2012

(54) DIRECT CURRENT POWER SUPPLY FOR MISSION CRITICAL APPLICATIONS

(75) Inventors: John B. Kammeter, Richmond, VA (US); Greg Schlueter, Highland Springs, VA (US); Vern Stant, Richmond, VA (US)

(73) Assignee: Power Distribution, Inc., Richmond, VA (US)

(*) Notice: Subject to any disclaimer, the term of this patent is extended or adjusted under 35 U.S.C. 154(b) by 700 days.

(21) Appl. No.: 12/562,597

(22) Filed: Sep. 18, 2009

(65) Prior Publication Data
US 2011/0068634 A1   Mar. 24, 2011

(51) Int. Cl.
*H02J 1/10* (2006.01)
(52) U.S. Cl. .......................... 363/65; 307/151
(58) Field of Classification Search ............ 307/52, 307/151; 363/65, 69
See application file for complete search history.

(56) References Cited

U.S. PATENT DOCUMENTS

| | | | |
|---|---|---|---|
| 3,205,427 A * | 9/1965 | Maier | 363/109 |
| 4,924,170 A | 5/1990 | Henze | |
| 5,157,269 A | 10/1992 | Jordan et al. | |
| 5,177,372 A | 1/1993 | Yajima et al. | |
| 5,200,643 A | 4/1993 | Brown | |
| 5,671,127 A | 9/1997 | Maezawa et al. | |
| 5,682,303 A | 10/1997 | Goad | |
| 5,724,237 A | 3/1998 | Hunter | |
| 5,740,023 A | 4/1998 | Brooke et al. | |
| 5,752,047 A | 5/1998 | Darty et al. | |
| 5,834,925 A | 11/1998 | Chesavage | |
| 5,875,104 A | 2/1999 | Prager | |
| 6,009,000 A | 12/1999 | Siri | |
| 6,046,513 A | 4/2000 | Jouper | |
| 6,381,155 B1 | 4/2002 | Kadatsky et al. | |
| 6,437,547 B2 | 8/2002 | Petricek et al. | |
| 6,583,999 B1 | 6/2003 | Spindler et al. | |
| 6,614,133 B2 | 9/2003 | Belson et al. | |
| 6,664,774 B2 | 12/2003 | Lethellier | |
| 6,680,604 B2 | 1/2004 | Muratov et al. | |
| 6,735,704 B1 | 5/2004 | Butka et al. | |
| 6,768,225 B2 | 7/2004 | Chang et al. | |
| 6,768,658 B2 | 7/2004 | Perry | |
| 6,771,052 B2 | 8/2004 | Ostojic | |
| 6,972,572 B2 | 12/2005 | Mernyk et al. | |
| 6,995,548 B2 | 2/2006 | Walters et al. | |
| 7,002,263 B2 | 2/2006 | Inn et al. | |
| 7,007,179 B2 | 2/2006 | Mares et al. | |
| 7,016,171 B2 | 3/2006 | Bax et al. | |
| 7,038,897 B2 | 5/2006 | Csanky et al. | |
| 7,043,648 B2 | 5/2006 | Tokunaga | |
| 7,054,175 B2 | 5/2006 | Kurio et al. | |

(Continued)

*Primary Examiner* — Daniel Cavallari
(74) *Attorney, Agent, or Firm* — Bacon & Thomas, PLLC

(57) ABSTRACT

A DC power supply apparatus and method of supplying DC power for mission critical applications utilizes multiple power circuits in one unit, the power circuits being optimizable for efficiency as the load increases or decreases. The individual power supplies may use a multiphase topology within the power circuits, with logic phase shifts between multiphase, and two types of power management circuits arranged in parallel, or an equivalent controller, for implementing: (a) a variable linear or variable exponential precision droop algorithm, and (b) a "virtual bus" or current averaging/active current sharing circuit, the current sharing being provided by a low bandwidth communications link between droop controllers in each of the power circuits. In addition, the droop/paralleling circuitry and/or programmed components may be arranged to implement two types of arc detection and suppression, including: (a) unequal positive and negative current in each power circuit to shut down the output power, and (b) monitoring output current for an arc "signature" to protect against arcs between positive and negative.

21 Claims, 2 Drawing Sheets

U.S. PATENT DOCUMENTS

| | | |
|---|---|---|
| 7,064,941 B2 | 6/2006 | Bax |
| 7,068,480 B2 | 6/2006 | Wong et al. |
| 7,106,069 B2 | 9/2006 | Kim et al. |
| 7,151,656 B2 | 12/2006 | Dvorak et al. |
| 7,157,890 B1 | 1/2007 | Kris |
| 7,180,299 B2 | 2/2007 | Mernyk et al. |
| 7,205,772 B2 | 4/2007 | Naidu et al. |
| 7,219,023 B2 | 5/2007 | Banke et al. |
| 7,222,246 B2 | 5/2007 | Pomaranski et al. |
| 7,227,729 B2 | 6/2007 | Parker et al. |
| 7,233,463 B2 | 6/2007 | Langford et al. |
| 2006/0072270 A1 | 4/2006 | Mladenik et al. |

* cited by examiner

DIRECT CURRENT POWER SUPPLY FOR MISSION CRITICAL APPLICATIONS

BACKGROUND OF THE INVENTION

1. Field of the Invention

This invention relates to a direct current power supply or "transmutor" for use in mission critical applications, and in particular to an apparatus and method for converting direct current (DC) or alternating current (AC) power into regulated DC power having the same or different voltage levels. The invention employs multiple power circuits and a combination of "droop" compensation and "virtual bus" current sharing (also known as "active current sharing" or "current averaging") to provide optimal efficiency and load management over an extended load range.

In particular, the invention relates to a DC power supply apparatus and method of supplying DC power for mission critical applications that includes one or more of the following features:
- multiple power circuits in one unit, the power circuits being optimizable for efficiency as the load increases or decreases;
- A multiphase topology within the power circuits, with logic phase shifts between multiphase;
- Two types of power management circuits arranged in parallel or a controller having corresponding programming, or any combination of a programmed controller or components and dedicated circuitry, for implementing: (a) a variable linear or variable exponential precision droop algorithm circuit, and (b) a "virtual paralleling bus algorithm" or current averaging/active current sharing circuit;
- Circuitry and/or programmed components for implementing two types of arc detection and suppression, including: (a) unequal positive and negative current in each power circuit to shut down the output power, and (b) monitoring output current for an arc "signature" to protect against arcs between positive and negative.

2. Description of Related Art

Conventional methods used in transmuting power from one configuration and/or voltage level to another have a single phase internal topology and one circuit to deliver power over the entire load range. However, as society has become more reliant on digital computing systems, it has become necessary to provide ever more reliable sources of low voltage DC power. To accomplish this, it has become common to provide parallel regulated power supplies connected to share the load so that the individual power supplies can operate closer to peak efficiency while still leaving room for increases in power due to increases in the load, or replacement of one or more of the individual power supplies. A problem with such arrangements is that the currents drawn by the loads may vary widely and in different ways, particularly when multiple loads share the power supply, making it difficult to supply a constant output voltage and obtain optimum efficiency.

In general, present multiple power circuit designs have efficiencies of 89 to 93% over a load range of 75 to 110% and are 80 to 85% efficient at ¼ loads. Mission critical loads have N+N redundant power sources that load share and the load power draw may vary by 2:1 depending on the amount of computing the processors are performing. A server, for example, may typically use only ½ rated power with short excursions using 100% power. With N+N redundant power sources sharing the load, each power source would supply ½ the load. Therefore, the power sources normally operate at 50% rated power with short power excursions using 100% power. In order to reduce the heat load in a mission critical site, the power sources should have efficiencies of at least 95% from 30% load to 100% load.

The cheapest and easiest solution to high efficiency is to use multiple circuits and load management. For example, in a single power source module topology using four power circuits, each circuit would be rated slightly over ⅔ of power source module rating. Each of the four power circuits would be optimized to have high efficiency from 75 to 110%. As the load is increases, the power circuits are paralleled. The method would attain 95% over the extended range of the load. Any reasonable number of power circuits could operate as described above.

There are currently two principal ways of managing the load in such a system. The first, called the droop method or algorithm, is to simply reduce the output voltage of each individual power circuit y an appropriate amount whenever the current increases. The second, which may also be referred to as the current averaging method, which may be referred to as "virtual bus" method or algorithm, "current averaging," or "active current sharing," involves comparison of the output of each individual power source with an average of the total output of the power sources, and generating an error signal to dampen deviations from average by driving the correction signal to zero within the accuracy of the controller.

Numerous ways of achieving droop compensation are known those skilled in the art. For example, compensation for droop can be accomplished by providing a series impedance at the output of the power source. However, to avoid power losses, the same effect can be obtained by monitoring the output current and controlling the power supply output accordingly, for example by changing the duty cycle of multiphase switching signals in a multiphase power circuit, or by varying inductances in the power conversion circuit. In general, more complex droop algorithms can be implemented through the use of digital monitoring and control, including use of non-linear droop algorithms.

There are also numerous ways to implement the virtual bus or current averaging/active current sharing method, including the use of op amps and/or comparators to generate the correction signal by comparing the output of individual power supply with the output or outputs of other power supplies. In addition, virtual bus current sharing can also involve a purely digital control based on inputs from each of the individual power supplies.

Each of these methods has advantages and disadvantages that make one or the other better for particular applications, but not optimal for any particular application. For example, while the droop method provides an immediate response to changes in output of an individual power supply, it is limited by the accuracy of current sensing and cannot adequately account for drift or deviations in the output of the individual current supplies. In general, droop compensation is effective at greater than two or three percent of full load. On the other hand, virtual bus current sharing can provide greater accuracy, but is subject to instabilities in the feedback loop application of the correction factor to an individual power supply will affect the overall current average, causing the correction factor to change, and so forth, necessitating a relatively low bandwidth and making it difficult to keep up with large current oscillations or failure of one or more of the parallel power supplies.

It has previously been proposed to solve these problems by modifying either the droop control or active current sharing/current averaging control methods and apparatus to obtain a hybrid control, as disclosed for example in U.S. Pat. No. 6,201,723 and U.S. Patent Publication No. 2006/0209580.

However, the previously proposed methods and apparatus are either overly complicated or fail to achieve desired current compensation over a range of loads/conditions.

In addition, the prior methods and apparatus fail to take into account problems such as arc suppression/prevention that are essential in mission critical applications where failure of the power supply would have severe consequences. Arc faults are more serious in DC power than in AC power since an AC voltage has zero amplitude twice a cycle whereas DC is continuous and the arc is not extinguish until the arc burns a path long enough that the applied voltage will not maintain the arc. The heat from the arc can burn personnel or equipment near by.

SUMMARY OF THE INVENTION

It is accordingly an objective of the invention to provide a DC power supply method and apparatus for mission critical applications that provides optimal efficiency over a wide range of loads and conditions, that may be applied to a variety of different applications, and that is relatively simple to implement.

These objectives are accomplished, in the accordance with the principles of a preferred embodiment of the invention, by a DC power supply apparatus and method of supplying DC power for mission critical applications that utilizes multiple power circuits in one unit, the power circuits being optimizable for efficiency as the load increases or decreases. The individual power supplies may use a multiphase topology within the power circuits, with logic phase shifts between multiphase, and two types of power management circuits arranged in parallel, or an equivalent controller, for implementing: (a) a variable linear or variable exponential precision droop algorithm, and (b) a "virtual bus" or current averaging/active current sharing circuit, the current sharing being provided by a low bandwidth communications link between droop controllers in each of the power circuits. In addition, the droop/paralleling circuitry and/or programmed components may be arranged to implement two types of arc detection and suppression, including: (a) unequal positive and negative current in each power circuit to shut down the output power, and (b) monitoring output current for an arc "signature" to protect against arcs between positive and negative.

DETAILED DESCRIPTION OF THE PREFERRED EMBODIMENTS

Figure 1:
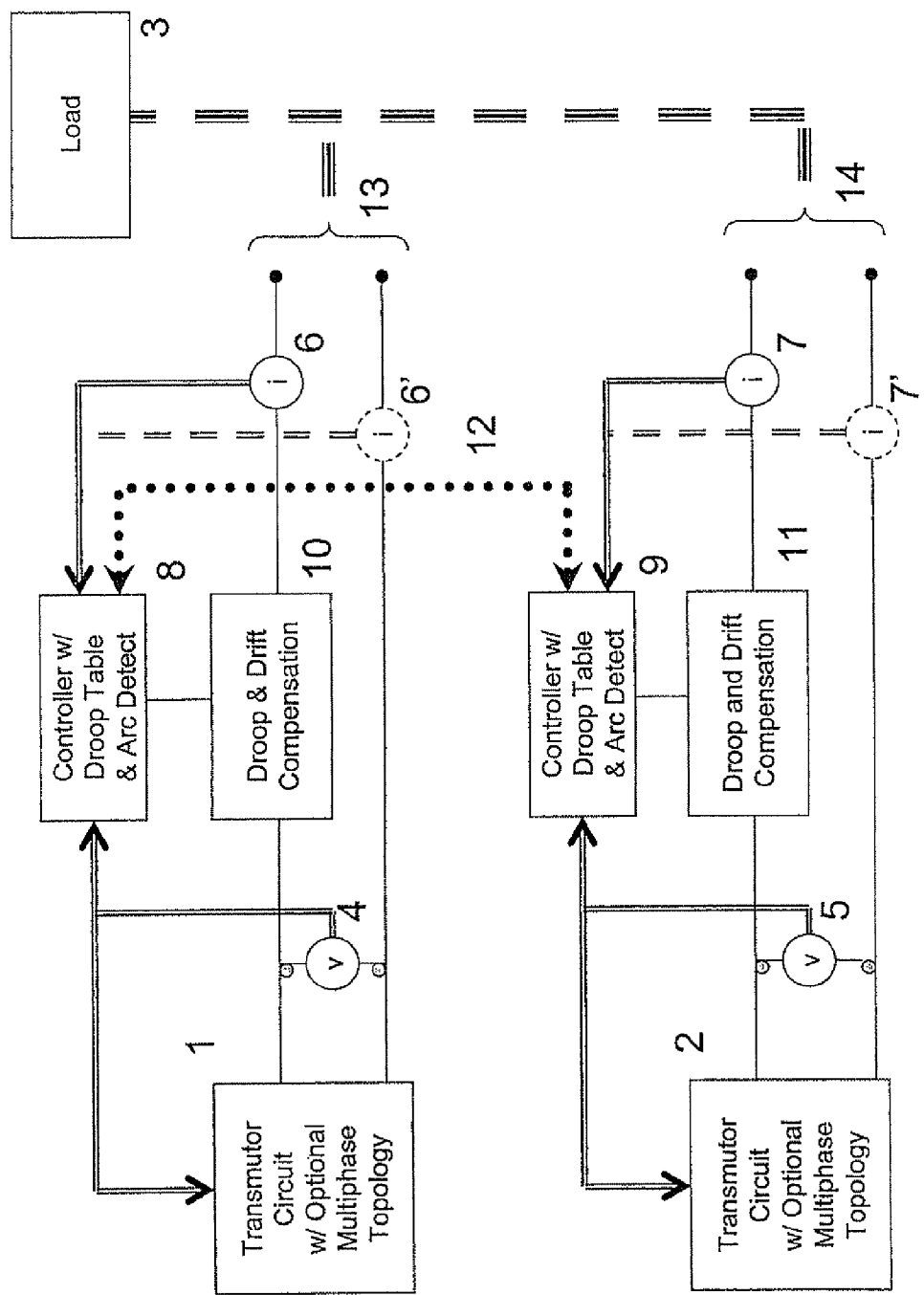
FIG. 1 is a schematic block diagram showing basic elements of a power supply to which the principles of a preferred embodiment of the invention may be applied.

As shown in FIG. 1, the preferred embodiment of the invention is applied to a power supply having multiple individual transmutor circuits or modules 1,2 connected through a low bandwidth communications link 12. Each of the transmutor modules includes a droop controller 8,9 and a droop compensation circuit 10,11 for adjusting the voltage under control of the droop controller 8,9. Furthermore, long term drift compensation is provided by a low bandwidth communications link 12 that serves to communicate current output data between controllers in order to provide a "virtual bus" or current averaging function.

Although only two transmutor modules are shown, the number of transmutor modules may be any number greater than two. In general, the number of transmutor modules will depend on whether the modules are being paralleled for capacity or redundancy. If the modules are being paralleled for capacity, then each module is operational and all modules must share the load in proportion to their maximum current rating. If the modules are being paralleled for redundancy, then more modules are paralleled than are required to supply system full load power, in which case the degree of redundancy is defined by the expression "N+M" where N is the number of modules required to supply system full load and M is the number of extra or redundant modules that could fail while still supplying a full load.

According to the preferred embodiment of the invention, the outputs 13,14 of the individual transmutor modules 1,2 are transmitted over one or more power lines or output bus 15 to supply power to a load 3, represented as a single element, but which may take the form of multiple elements, such as multiple computers or other devices that require a constant voltage DC power supply. In order to implement the preferred embodiment, it is necessary to measure the output voltage of each transmutor module, and the current drawn by the load. The measuring devices are schematically represented by voltage measuring devices 4,5 and current measuring devices 6,7 although in practice the voltage and current measuring devices would likely be implemented in the form of A/D converters having enough bits to provide an accuracy of at least several times (for example, ten times), of the required system voltage regulation specification. Details of the measuring devices will be readily understood by those skilled in the art, and form no part of the present invention, which should not be limited to any particular type of voltage or current measuring device.

The outputs of voltage measuring devices 4,5 may be used by the transmutor modules for normal voltage regulation, and in addition are used by a controller, together with the output of the current measuring devices 6,7 to determine the amount of compensation applied to the output of the transmutor modules according to the algorithm described below. Controllers 8,9 may be implemented as a programmed digital processor circuit, as a non-programmable dedicated circuit, or as a combination of programmable and dedicated circuit elements. Finally, the preferred embodiment also includes a droop or current compensation element 10,11 that varies the output voltage under control of controllers 8,9, and which may take the form of an impedance in the output or any other means for varying the voltage output by the transmutor, including feedback to components of the transmutor such as a pulse width modulator or transformer circuit, depending on the specific type of transmutor module or, in case of a power module a microprocessor, DSP, FPGA or similar device to regulate the output voltage, droop compensation devices 10,11 may take the form of a table or an equation incorporated directly into the transmutor module software to make the output voltage vary as the output current is changed.

Those skilled in the art will appreciate that the transmutor modules may be either AC to DC inverters or DC to DC converter circuits, and that the invention may be applied to a variety of different such transmutors. The details of the transmutors form no part of the present invention, although in general the transmutors should include some sort of voltage feedback circuit to maintain a constant voltage output.

Although the respective transmutor modules are illustrated as single phase modules, the power circuits may also use a multiphase topology with logic phase shifts between phases, i.e., the droop and drift compensation may be applied to each phase individually, according to the formula:

$$\text{Phase Shift} = 1/(T*3*n),$$

where n is any even multiple of three. The multiphase approach increases power circuit efficiency and greatly decreases filter requirements.

In one example of a multiple phase topology, a DC power input is fed to multiple pairs of power switching devices. For a three phase system, the logic would generate three drive signals 120 degrees apart, with the outputs of three pairs of power switching devices being routed to a three legged, three phase transformer. The transformer output would then be in the form of three square waves with a 60 degree overlap. The three square waves are converted to DC using active components to minimize voltage drops. This arrangement has the advantage that there is no gap between transformer output waveforms, and therefore the converted waveform has insignificant ripple. Furthermore, to optimize performance, the phase shift of a first phase A between each power circuit could be varied to decrease input current pulse and output ripple switching noise. Although any number of phases can be used, three, six, or twelve equally displaced in phase would yield the highest transformer performance.

Droop Compensation

Controllers 8,9 includes a droop table or equation that defines a load current versus load voltage function, obtained by removing modules from a shared droop system and determining the effect on the other modules as the load is varied. The shared droop system used to generate the droop table or equation may be a linear droop system using resistors, although other shared droop systems or models could be used. As is known to those skilled in the art, the table or equation may be arranged to make the voltage droop, i.e., the voltage to decrease, linearly as the current increase, enabling a resistive droop to be simulated electronically, without lowering the module efficiency as it does pure resistive droop.

The output voltage could also be made to droop in a nonlinear manner as the current increases, as is also known in to those skilled in the art. In many cases, nonlinear electronic droop can be more effective than electronic linear droop because nonlinear droop can provide more droop at high loads than at light loads. An example of nonlinear droop would be simple exponential droop, as follows:

$$V\text{out} = Vnl - (\text{EXP}(k*I) - 1) \text{ Where:}$$

Vout=output voltage as a function of current, I
Vnl=No load output voltage
I=output current
K=constant=$[(1/I)*\ln(Vnl+1+Vout)]$
    Where the Vout value and the I value is defined at rated full load.

Vnl−Vout (at full load) is the maximum droop voltage. The maximum droop voltage is some percent of allowed regulation, typically ⅓ to ½ of the maximum allowed regulation. According to a preferred embodiment of the invention, a software table of droop voltage verses current is generated from the equation, and made accessible to the controllers 8,9. Additional terms can be added to the equation and thus generate table values to shape the droop curve to obtain any desired effect. Furthermore, additional terms can also produce "current limiting" to the degree desired.

Those skilled in the art will appreciate that processing devices and hardware having the necessary precision and/or linearity to implement controllers 8,9 are currently available, but that existing commercially available voltage sensors 4,5 and current sensors 6,7 and sensor circuits may not have the accuracy or linearity required for certain applications over an the expected life of the power supply. For example, many mission critical applications may require five years of trouble free, low drift operation. In that case, so long as stable components are used in the module circuits, a module voltage and current correction table can be generated and stored in non-volatile memory at time of manufacture. The precision and linearity of voltage and current monitoring would then depend on the number of points in the correction table.

Virtual Bus or Current Averaging/Active Current Sharing Algorithm

In addition to the droop compensation, the controllers of the preferred embodiment of the invention are arranged to provide current averaging or "virtual bus" compensation, which involves comparing the local module current measured by sensors 6,7 with currents of other modules. According to the invention, the current data is shared over low bandwidth communications link 12.

One of the advantages of droop is that the modules do not have to be physically close and do not require a high bandwidth communication link between modules to balance module currents. High bandwidth current feedback between multi-modules in a parallel system generally has stability problems so that when step loads are applied or removed, "ringing" occurs in the output voltage. In contrast, in a droop system, it is only necessary to correct long term drifts in communications between modules. Each module operates independently and the communication link 12 between modules with droop in a parallel system can have very low bandwidth. The communication link 12 transmits and receives digital words defining the table step each module is using. If all modules are on the same step in steady state, there is probably no drift outside the "dead band". If the modules are not on the same step the following applies:

If there are two modules in the system, it is difficult to determine which is faulty. One method is to alert the controller of the situation and average the two voltages and/or current and recalibrate the tables in both modules. In addition, all modules should have internal circuits to shut down and alert the module if the current amplitude exceeds preset limits.

If there are three or more modules, "majority voting circuits" can determine the correct values. The majority of modules recalibrate their tables. Non-majority modules are taken off line and the controller alerted.

Since the communications link is only used for recalibration due to long term drifts, there is no immediate problem if the link is broken. Integrity signal are continuously send over the link the verify link connection. Again, the bandwidth of the communication links can be ultra-low and therefore low noise, since the links are only correcting for long term drifts. In case a multiphase topology is used, the communications link 12 is preferably a tri-redundant signal bus with voting circuits if the virtual bus algorithm is used.

Figure 2:
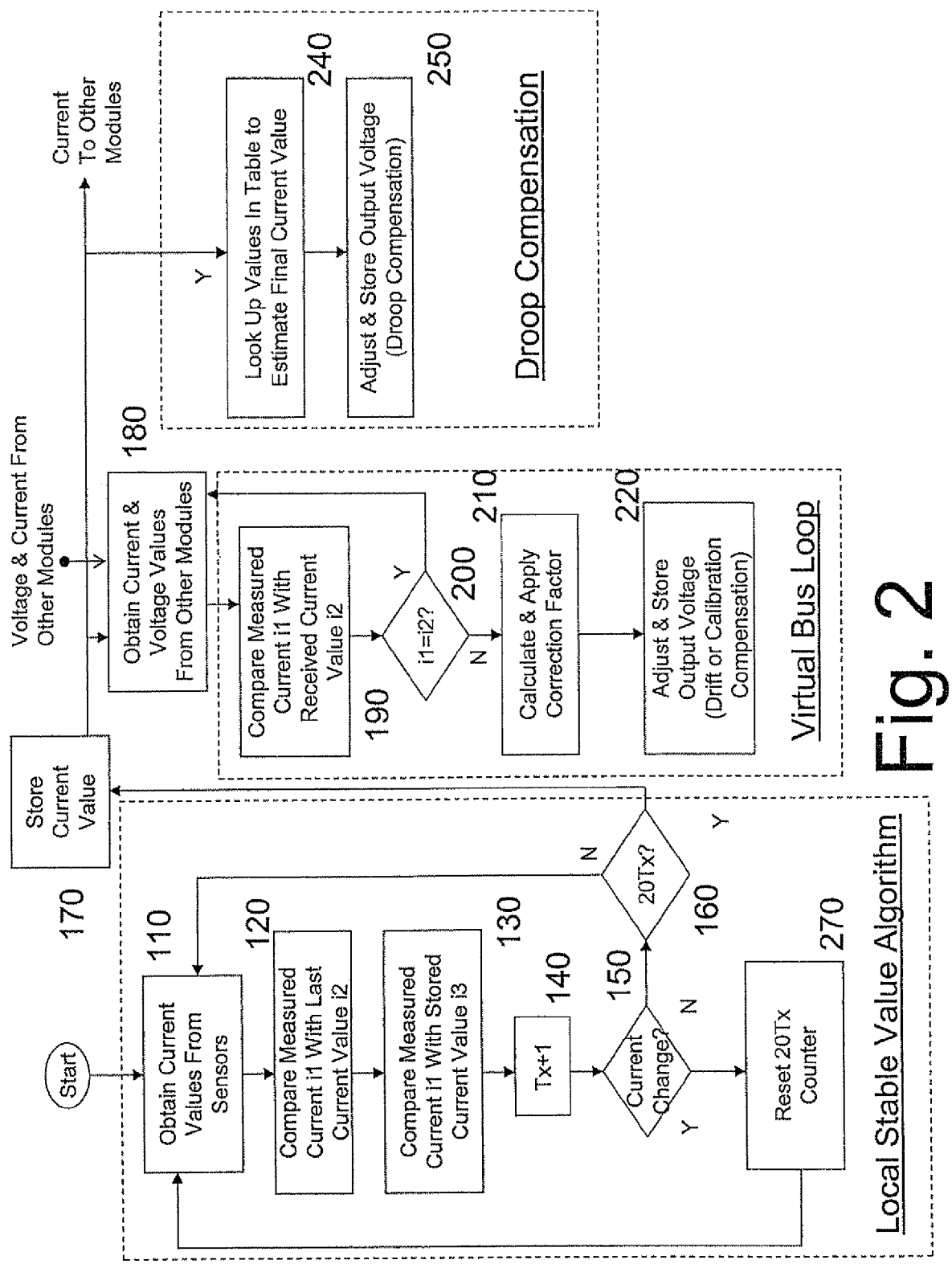
FIG. 2 is a flowchart illustrating a method of load sharing regulation according to the preferred embodiment of the invention.

The apparatus of FIG. 1 may be arranged to carry out the method illustrated in FIG. 2, which carries out both a droop algorithm and a virtual bus algorithm. Although specific versions of these algorithms are illustrated and discussed below, those skilled in the art will appreciate that details of the algorithms may be varied in numerous ways without departing from the scope of the invention. In fact, there are many digital and/or analog algorithms and/or processes that can accomplish the same result. The below example is for two modules in parallel. The algorithm for a multi-module, parallel system would have to be slightly modified from the example steps.

Arc Detection and Suppression

The controllers 8,9 may also be used to achieve arc detection and suppression. Arcs between positive and negative may be protected against by monitoring the output current for changes that indicate the presence of an arc, i.e., for an arc signature. The arc signature will typically take the form of high frequency noise or low frequency modulation with a large amplitude, each of which can be easily be detected. In addition, an arc can cause current overload, which will also shut down the module.

To address the possibility of arcs to ground, additional current sensors 6' and 7' may optionally be included so that the controller detects unequal positive and negative output currents in a respective module, which are indicative of arcs to ground, and shut down the module accordingly, preferably within 100 ms.

An Exemplary Method

The illustrated example of FIG. 2 assumes two modules connected in parallel, i.e. both module outputs tied together and the modules are operating in a steady state condition. In addition, the example assumes the following module parameters:

- Each module measures the output voltage and the module current with an A/D converter having enough bits to provide an accuracy of at least ten times of the specified system voltage regulation specification.
- The droop is ½ the system voltage regulation specification.
- The software program "loop time" to sample the output voltage, the module current, look-up values in the droop table and calculate the action to take is Tx microseconds.
- The Droop Table has enough steps to provide the voltage regulation and current sharing specified.
- The software stores the last value of current that has been relatively stable for a period of approximately 20 Tx
- There is a current and output voltage steady state dead band that will meet system specifications.

Steps 110 to 160 look for changes in current in respective modules. In particular, the controller obtains or reads measured voltages and current values in step 110, then compares the measured current value with a stored steady state current value in step 120. As indicated by steps 140-160, if no current change has occurred, the controller waits for 20 Tx and stores the current value (step 170), whereupon the controller proceeds to the virtual bus and/or droop compensation loops or algorithms. If a current change has occurred, the controller resets the counter and repeats steps 110 to 160 until it is determined that no change has occurred.

Once the current in both modules has been stable for at least a time period of 20 Tx, both the current and voltage in the individual modules is monitored (step 180). The droop compensation and drift compensation Loop (virtual bus loop) generate independent correction signals. Both loops begin with the respective steps of checking for changes in currents. The stable current value stored in step 170 is used in the droop compensation, with steps 240 and 250 ensuring that all modules current share.

In the virtual bus loop, the controller checks data received in step 180 over the low bandwidth communications link for changes in current readings of another module, indicating current drift (steps 190 and 200). If no change has occurred, the controller returns to step 180. If a change has occurred, then the controller proceeds to calculate and apply a correction factor (step 210), for use in adjusting the output voltage in order to achieve drift or calibration compensation (step 220). After correction, the controller may proceed to the droop algorithm or return to step 110 via step 270 to wait for the module current to return to a steady state.

In order to prevent unstable operation, the bandwidth of the correction loop must be very low because any change in any power module will change the virtual bus, i.e., the current signal being carried by the communications link, which will change the correction signal.

The droop compensation loop begins by comparing the measured current with the stored "steady state" current value, for example resulting from an additional load being applied to the output bus, each module detects a change in current from the stored steady state value. From the droop table an estimate of the final step in the table is obtained (step 240), and the software uses the table values of a point in the table approximately halfway between the steady state value of current and the estimated value of current as the basis for calculating adjustment of the output voltage (droop compensation) (step 260).

Tx can be 2 to 3 microseconds, depending on the speed and type of the processing device, a steady state can be achieved in a time period of 12 Tx or 24 to 36 microseconds. Of course the response time is largely dependent on the load change amplitude and the amplitude of the steady state "dead band".

Again, the above is an example of one simple algorithm, there are many digital and/or analog algorithms and/or processes that can accomplish the same result for two or more modules in a parallel system.

Having thus described a preferred embodiment of the invention and variations of the preferred embodiment in sufficient detail to enable those skilled in the art to make and use the invention, it will nevertheless be appreciated that numerous variations and modifications of the illustrated embodiment may be made without departing from the spirit of the invention. Accordingly, it is intended that the invention not be limited by the above description or accompanying drawings, but that it be defined solely in accordance with the appended claims.

We claim:

1. A direct current power supply apparatus, comprising:
   a plurality of transmutor modules;
   current and voltage sensors connected to an output of each of said transmutor modules;
   a droop controller connected to said output of each of said transmutor modules;
   a respective compensation device connected to each droop controller for adjusting an output voltage of each transmutor module under control of said droop controller; and
   a low bandwidth communications link connecting said droop controllers for sharing current data,
   wherein the droop controller implements a droop algorithm for respectively adjusting said module output voltages to compensate for droop at the respective module outputs, and
   said droop controller also implements a virtual bus algorithm in parallel with said droop algorithm for adjusting an output current by a correction factor calculated according to current data supplied by said low bandwidth communications link, said virtual bus algorithm being used solely for recalibration due to long term drifts.

2. A direct current power supply apparatus as claimed in claim 1, wherein said transmutor modules are multiphase transmutor modules.

3. A direct current power supply apparatus as claimed 2, wherein said transmutor modules are three phase transmutor modules, in which a DC power input is fed to three pairs of power switching devices and the power switching device outputs are routed to a three legged, three phase transformer that outputs three square waves with a 60 degree overlap.

4. A direct current power supply apparatus as claimed in claim 3, wherein said communications link is a tri-redundant signal bus.

5. A direct current power supply apparatus as claimed in claim 1, wherein said droop algorithm is a non-linear droop algorithm.

6. A direct current power supply apparatus as claimed in claim 1, wherein said nonlinear droop is an exponential droop such that:

$$Vout=Vnl-(EXP(k*I)-1), \text{ where:}$$

Vout=output voltage as a function of current, I,
Vnl=No load output voltage,
I=output current, and
K=constant=$[(1/I)*\ln(Vnl+1+Vout)]$
where the Vout value and the I value is defined at rated full load, and
wherein Vnl−Vout (at full load) is the maximum droop voltage.

7. A direct current power supply apparatus as claimed in claim 1, wherein said controller includes a droop table that defines a load current versus load voltage function, obtained by removing modules from a shared droop system and determining an effect on the other modules as the load is varied.

8. A direct current power supply apparatus as claimed in claim 1, wherein said controller further executes arc detection and suppression.

9. A direct current power supply apparatus as claimed in claim 8, wherein said arc detection is executed by monitoring module output currents for signatures indicative of arcing between positive and negative wires connected to said output.

10. A direct current power supply apparatus as claimed in claim 9, wherein said signatures include high frequency noise or low frequency modulation with large amplitude.

11. A direct current power supply apparatus as claimed in claim 9, wherein said arc detection further comprises detection of difference between positive and negative currents that are indicative of arcing to ground.

12. A direct current power supply apparatus as claimed in claim 8, wherein said arc detection is executed by monitoring positive and negative current outputs for differences indicative of arcing to ground.

13. A direct current power supply method for a DC power supply that includes a plurality of transmutor modules; a droop controller connected to an output of each of said transmutor modules; a respective compensation device connected to each droop controller for adjusting an output voltage of each transmutor module under control of said droop controller; and a low bandwidth communications link connecting said droop controllers for sharing current data, comprising the steps of:

the droop controller implementing a droop algorithm for respectively adjusting said module output voltages to compensate for droop at the respective module outputs, and said droop controller also implementing a virtual bus algorithm in parallel with said droop algorithm for adjusting an output current by a correction factor calculated according to current data supplied by said low bandwidth communications link, said virtual bus algorithm being used solely for recalibration due to long term drifts.

14. A direct current power supply method as claimed in claim 13, wherein said droop algorithm is a non-linear droop algorithm.

15. A direct current power supply apparatus as claimed in claim 14, wherein said nonlinear droop is an exponential droop such that:

$$Vout=Vnl-(EXP(k*I)-1), \text{ where:}$$

Vout=output voltage as a function of current, I,
Vnl=No load output voltage,
I=output current, and
K=constant=$[(1/I)*\ln(Vnl+1+Vout)]$
where the Vout value and the I value is defined at rated full load, and
wherein Vnl−Vout (at full load) is the maximum droop voltage.

16. A direct current power supply apparatus as claimed in claim 13, wherein said controller carries out said droop algorithm by referring to a droop table that defines a load current versus load voltage function, obtained by removing modules from a shared droop system and determining an effect on the other modules as the load is varied.

17. A direct current power supply apparatus as claimed in claim 13, wherein said controller further executes arc detection and suppression.

18. A direct current power supply apparatus as claimed in claim 17, wherein said arc detection is executed by monitoring module output currents for signatures indicative of arcing between positive and negative wires connected to said output.

19. A direct current power supply apparatus as claimed in claim 18, wherein said signatures include high frequency noise or low frequency modulation with large amplitude.

20. A direct current power supply apparatus as claimed in claim 17, wherein said arc detection further comprises detection of difference between positive and negative currents that are indicative of arcing to ground.

21. A direct current power supply apparatus as claimed in claim 13, wherein said arc detection is executed by monitoring positive and negative current outputs for differences indicative of arcing to ground.

* * * * *